(12) United States Patent
    Keller et al.

(10) Patent No.: US 10,818,433 B1
(45) Date of Patent: Oct. 27, 2020

(54) ENHANCING DIELECTRIC CONSTANTS OF ELASTOMER SHEETS

(71) Applicant: Facebook Technologies, LLC, Menlo Park, CA (US)

(72) Inventors: Sean Jason Keller, Bellevue, WA (US); Tristan Thomas Trutna, Seattle, WA (US); Vincenzo Casasanta, III, Woodinville, WA (US); David R. Perek, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/578,052

(22) Filed: Sep. 20, 2019

Related U.S. Application Data

(62) Division of application No. 14/936,636, filed on Nov. 9, 2015, now Pat. No. 10,460,873.

(51) Int. Cl.
    *B29C 43/02* (2006.01)
    *H01G 4/20* (2006.01)
(52) U.S. Cl.
    CPC .................... *H01G 4/206* (2013.01)
(58) Field of Classification Search
    CPC ............ B29C 35/007; B29C 35/0288; B29C 35/0294; B29C 43/003; B29C 43/02
    USPC ........................................... 264/451
    See application file for complete search history.

(56) References Cited

U.S. PATENT DOCUMENTS

| 2,849,312 | A | 8/1958 | Peterman |
| 5,248,864 | A | 9/1993 | Kodokian |
| 2010/0103638 | A1 | 4/2010 | Oohira |
| 2013/0196015 | A1* | 8/2013 | Metsugi et al. ...... B29C 35/007 425/144 |

* cited by examiner

*Primary Examiner* — Jeffrey M Wollschlager
*Assistant Examiner* — Xue H Liu
(74) *Attorney, Agent, or Firm* — Fenwick & West LLP

(57) ABSTRACT

Dielectric ceramic particulates are introduced into thin a sheet of pre-cured elastomer to form a sheet. Successive layers of the sheets may then be laminated together to form a finished article. An electric field may be applied to the article during a curing process while the article is at a temperature near a Curie temperature of the dielectric ceramic particulates to increase a dielectric constant of the article. As each sheet may be different from each other in the finished article, the resulting finished article may have anisotropic dielectric and mechanical properties. Similarly, tiled dielectric ceramic structures may be introduced into the elastomers layers to generate materials with varying dielectric constants.

6 Claims, 4 Drawing Sheets

100

ENHANCING DIELECTRIC CONSTANTS OF ELASTOMER SHEETS

CROSS REFERENCE TO RELATED APPLICATIONS

This application is a division of co-pending U.S. application Ser. No. 14/936,636, filed Nov. 9, 2015, which is incorporated by reference in its entirety.

BACKGROUND

The present disclosure generally relates to sensors for virtual reality systems, and specifically to developing elastomeric materials for sensors.

Elastomeric materials can be used in various sensors to measure capacitance, which allows determination of user interaction with the elastomeric materials or with objects including the elastomeric materials. For example, a virtual reality system includes elastomeric materials in various components contacting a user to translate physical motion to virtual motion based on capacitance changes or other data captured via sensors including the elastomeric materials or includes actuators made from elastomeric materials that incur electrostatic induced stress or strain to provide tactile feedback to the user via interacting with the virtual reality system. As capacitance of a dielectric material increases proportionally to the value of the dielectric constant ($\kappa$) of the dielectric material, increasing values of dielectric constant for elastomeric materials allows actuators or other components including elastomer materials to be more sensitive or to incur greater stress or strain to provide better tactile feedback to a user. However, conventional methods for increasing values of dielectric constants of elastomeric materials makes the elastomeric materials less flexible, impairing use of the elastomeric materials with higher values of dielectric constant values in applications where flexibility is beneficial.

SUMMARY

Dielectric ceramic particulates may be layered onto an elastomer to increase a value of a dielectric constant of the elastomer while maintaining elasticity of the elastomer. For example, the dielectric ceramic particulates are screen printed or otherwise densely spread as a thin layer on top a thin layer of elastomer. The layer of dielectric ceramic particulates and the elastomer are then cured to produce an enhanced elastomer layer having a higher value of a dielectric constant than conventional elastomers because of the dielectric ceramic particulates while retaining the elasticity of the elastomer. As another example, the dielectric ceramic particulates are shaped into thin structures that are evenly placed on top of the thin layer of elastomer. The layer of dielectric ceramic particulates and the elastomer are then cured. Spacing between the thin structures of dielectric ceramic particulates in the layer on top of the elastomer reduces a brittleness of the cured elastomer and layer of dielectric ceramic particulates while increasing the value of the dielectric constant of the cured elastomer.

Additionally thin cured layers of dopants (e.g., dielectric ceramic particulates and dielectric ceramic structures) and elastomers may be stacked to increase the thickness of an elastomer while maintaining elasticity of the elastomer and increasing the value of the dielectric constant of the elastomer. The value of the dielectric constant and elasticity of different layers may be tuned by applying an electric field the elastomers onto which the dielectric ceramic particulates are deposited while maintaining a temperature at or near a melting point of the elastomer and a Curie temperature of the dielectric ceramic particulates. As the dielectric constant of a material is related to the material's net remnant ferroelectric polarization, which may be increased by poling near the material's Curie temperature, application of the electric field to the elastomer doped to include the dielectric ceramic particulates increases a value of the dielectric constant of the dielectric ceramic particulates. Hence, an overall elasticity and value of a dielectric constant for a structure comprising multiple cured layers be customized through customization of the elasticity and value of a dielectric constant for individual cured layers.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
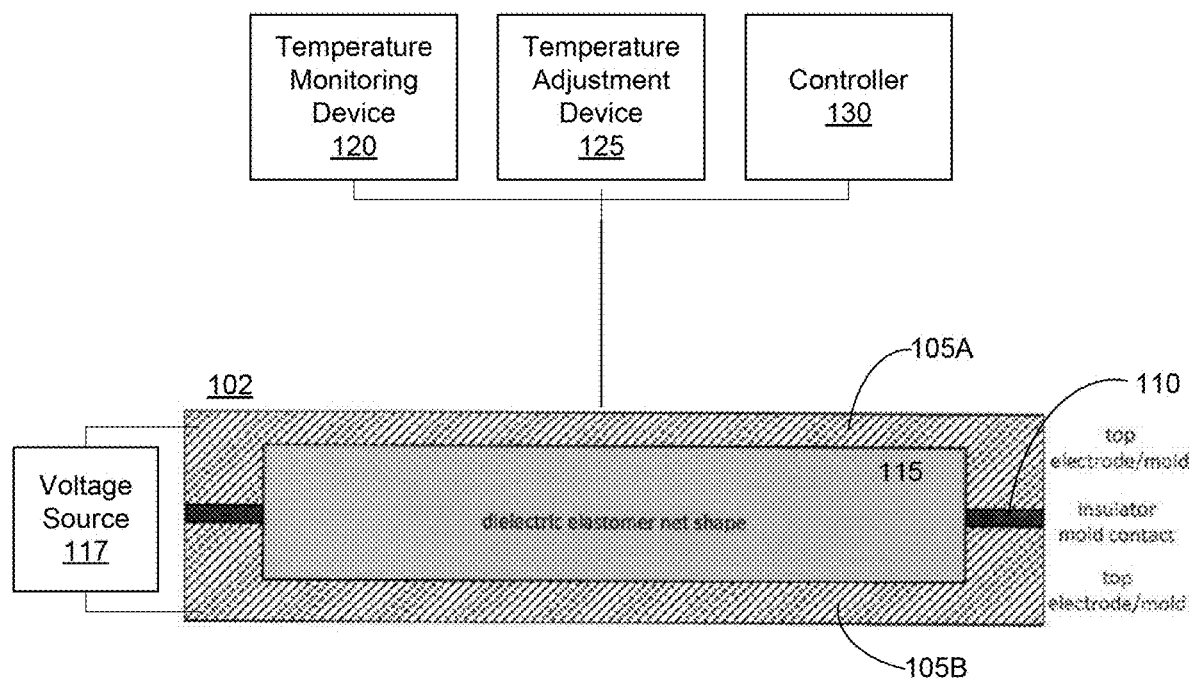
FIG. 1 is a block diagram of an enhanced elastomer molding system in accordance with an embodiment.

FIG. 1 is a block diagram of an enhanced molding system 100 for producing an enhanced elastomer, which is an elastomer doped to include dielectric particulates or otherwise modified to increase a value of a dielectric constant of the elastomer. The enhanced molding system 100 shown in FIG. 1 includes a molding system 102 for facilitating electrostatic poling of the enhanced elastomer by application of an electric field that modifies a value of a dielectric constant of dielectric particulates included in the elastomer. In various embodiments, the enhanced elastomer molding system 100 may be an injection molding system, a thermoset silicone compression molding system, a compression molding system, or any other suitable molding system. The enhanced elastomer molding system 100 includes the molding system 102, which is coupled to a temperature monitoring device 120, a temperature adjustment device 125, and a controller 130. The molding system 102 includes at least two electrodes 105A and 105B, one or more insulators 110, and a cavity 115. A voltage source 117 is coupled to the electrodes 105A, 105B to apply an electric field to an elastomer doped to include dielectric ceramic particulates included in the cavity 115 to create the enhanced elastomer having an increased value for a dielectric constant.

The two electrodes 105A and 105B are electrical conductors and include an anode and a cathode separated by one or more insulators 110. In various embodiments, the one or more insulators 110 have thicknesses ranging from 10 microns to 1000 microns, or any other suitable thickness preventing electrical breakdown. The one or more insulators 110 include ridges in some embodiments to prevent electrical breakdown of the insulators 110 by increasing the distance for current to arc around the one or more insulators 110.

The electrodes 105A and 105B are coupled to the voltage source 117 that applies a voltage to the electrodes 105A and 105B sufficient to produce an electric field on the order of 105 to 108 V/m in the cavity 115. For example, if the electrodes 105A and 105B are separated by 2 millimeters, the voltage source 117 applies 5000V to the electrodes 105A and 105B to produce an electric field of 5×106 V/m; hence, the voltage applied by the voltage source 117 may be based at least in part on the distance between electrode 105A and electrode 105B in various embodiments. Application of voltage to the electrodes 105A, 105B causes electrostatic poling of the dielectric ceramic particulates in an enhanced elastomer inserted into the cavity 117, increasing the net intrinsic polarization of the dielectric ceramic particulates, which increases a value of the dielectric constant of the enhanced elastomer, as further described below in conjunction with FIG. 4. In some embodiments, the voltage source 117 applies voltage to the electrodes 105A, 105B in short pulses to increase the electric field applied to the cavity 115, which may allow the voltage source 117 to apply voltages to the electrodes 105A, 105B that may potentially exceed a breakdown voltage of the one or more insulators 110 separating the electrodes 105A, 105B to produce larger a larger electric field within the cavity 115.

The cavity 115 is a gap between the electrodes 105A and 105B into which an elastomer doped to include one or more types of dielectric ceramic particulates or one or more dielectric ceramic structures may be inserted. In various embodiments, the cavity 115 height ranges from 50 microns to 1000 microns or ranges from 1 millimeter to 5 millimeters, allowing creation of enhanced elastomers having thicknesses of 50 microns to 1000 microns or of 1 millimeter to 5 millimeters, respectively. In various embodiments, the cavity 115 may have various cross-sectional shapes.

The temperature monitoring device 120 monitors the temperature in the cavity 115. For example, the temperature monitoring device includes a thermocouple, thermistor, or any other suitable temperature sensor. The temperature monitoring device 120 is capable of withstanding the electric field applied between the electrodes 105A, 105B when voltage is applied to the electrodes 105A, 105B, allowing the temperature monitoring device 120 to monitor temperature in the cavity 115 when voltage is applied to the electrodes 105A, 105B.

The temperature adjustment device 125 maintains a specified temperature within the cavity 115. For example, the temperature adjustment device 125 modifies the temperature within the cavity 115 to maintain a melt temperature of the elastomer in the cavity 115. The temperature adjustment device 125 may be any suitable device capable of heating or cooling the cavity 115 (e.g., an electric heater). Based on data from the temperature monitoring device 120, the temperature adjustment device 125 increases or decreases a temperature within the cavity 115 to maintain a particular temperature within the cavity. For example, the temperature adjustment device 125 receives a particular temperature from the temperature monitoring device 120 and modifies the temperature within the cavity 115 to within a threshold amount of the particular temperature. In other embodiments, the temperature adjustment device 125 receives instructions for adjusting the temperature within the cavity from the controller 130, which is further described below.

The controller 130 communicates with the voltage source 117, the temperature monitoring device 120, and the temperature adjustment device 125 to modify the temperature within the cavity 115 and to apply voltage to the electrodes 105A, 105B to apply an electric field to the cavity 115. In various embodiments, the controller 130 determines a duration that the voltage source 117 applies voltage to the electrodes 105A, 105B and communicates instructions to the voltage source 117 to apply or to cease application of the voltage to the electrodes 105A, 105B. Additionally, the controller 130 specifies a voltage to the voltage source 117 for application to the electrodes 105A, 105B. Hence, instructions from the controller 130 to the voltage source 117 cause application of voltage to the electrodes 105A, 105B for minutes to multiple hours, which specifies a duration that an electric field is applied to the cavity 115. As the controller 130 regulates application of temperature within the cavity 115 and application of voltage to the electrodes 105A, 105B, the controller 130 modifies curing of an elastomer in the cavity 115 and a value of a dielectric constant of dielectric ceramic particulates included in the elastomer in the cavity 115. This allows the enhanced elastomer molding system 100 to create an enhanced elastomer in the cavity 115 having a specific dielectric constant (κ) and elastic modulus (E). The controller 130 may receive feedback from the temperature monitoring device 120 and send instructions to the temperature adjustment device 125 to modify temperature in the cavity 115 based on the feedback to the temperature adjustment device 125.

In some embodiments, the enhanced elastomer molding system 100 includes a compression mechanism to produce an enhanced elastomer via compression molding. The temperature monitoring device 120, the temperature adjustment device 125, the controller 130, the electrodes 105A, 105B, and the voltage supply 117 perform as described above when compression molding is performed. When the enhanced elastomer molding system 100 includes the compression mechanism, the cavity 115 is filled with a preform comprising a silicone precursor material or other suitable elastomer compounded with dielectric ceramic particulates that has a clay-like consistency. The compression mechanism compresses the perform in the cavity 115 while the temperature within the cavity 115 is regulated by the temperature monitor 120, the temperature adjustment device 125, and the controller 130 until the preform cures. As described above, voltage is applied to the electrodes 105A, 105B by the voltage source 117 and the controller 130 while the preform in the cavity 115 is heated and compressed to pole the dielectric ceramic particulates in the preform.

Figure 2:
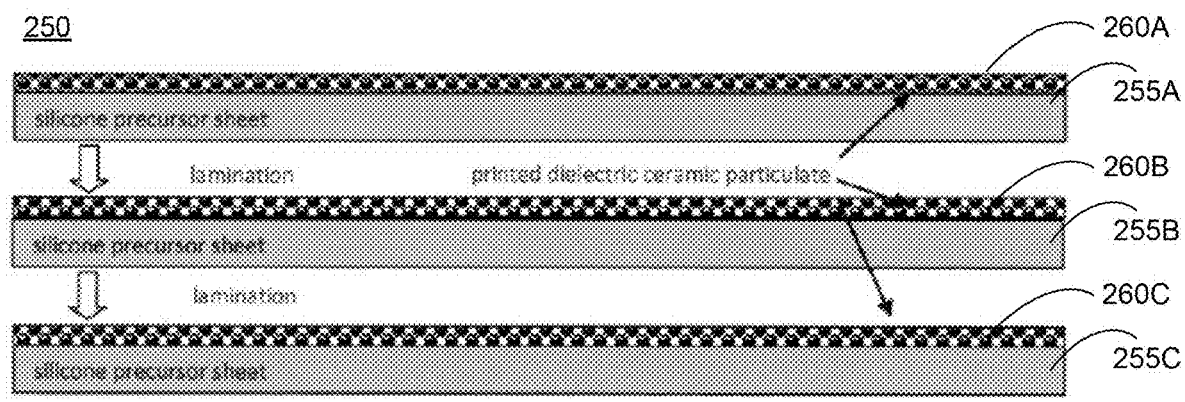
FIG. 2 is a diagram of introducing dielectric ceramic particulates into elastomers during compression mold curing, in accordance with an embodiment.

FIG. 2 is a diagram of one embodiment of introducing dielectric ceramic particulates into elastomers during compression mold curing. In the example of FIG. 2, three layers 255A-C of uncured elastomer (e.g., a silicone precursor) are shown. A layer of dielectric ceramic particulates 260A-C is directly printed onto each layer 255A-C of uncured elastomer. For example, a layer of dielectric ceramic particulates 260A is directly printed onto a surface of the layer 255A of uncured elastomer. Multiple layers 255A-C of uncured elastomer onto which a layer of dielectric ceramic particulates 260A-C may be calendared or layered to form an article 250, by compressing the layers under heat while an electric field is applied to the layers, as further described above in conjunction with FIG. 1, and as further described below in conjunction with FIG. 5. The article 250 may have a dielectric constant between 10 and 100 and an elastic modulus between 0.1 megapascals (MPa) to 10 MPa. Layering layers 255A-C of uncured elastomer and dielectric ceramic particulates 260A-C allows fine-tuning of the dielectric constant and elasticity of the article 250 by modifying the number of layers comprising the article 250.

The dielectric ceramic particulates 260A-C may be screen printed as an array or a pattern onto the layers 255A-C of uncured elastomer in some embodiments. Alternatively, the dielectric ceramic particulates 260A-C may be powder coated, slurry tape casted, or paste screen printed onto the layers 255A-C of uncured elastomer. Printing the dielectric ceramic particulates 260A-C onto the layers 255A-C of uncured elastomer using the preceding methods densifies the dielectric ceramic particulates 260A-C, which maximizes permittivity.

In one embodiment, dielectric ceramic particulates 260A-C are initially screen printed onto a substrate from which the screen printed dopants 260A-C may be removed easily. The dielectric ceramic particulates 260A-C are subsequently removed from the substrate and layered onto the layered onto the layers 255A-C of uncured elastomers (e.g., uncured silicone elastomer having a clay-like consistency). For example, the dielectric ceramic particulates 260A-C are screen printed onto an alumina substrate or any other suitable substrate comprising a material with properties and features allowing the dielectric ceramic particulates 260A-C to be lifted from the material. For example, the substrate comprises a material that burns out during sintering to leave cavities, openings, or three dimensional features produced in thick film processes. In various embodiments, the material that burns out during sintering is a layer organic polymer, such as epoxy. Creating patterns from burning out substrate material during sintering allows creation of dielectric ceramic patterns with a minimal thickness of 13 μm and features with dimensions on the order of 0.05 mm2.

Figure 3:
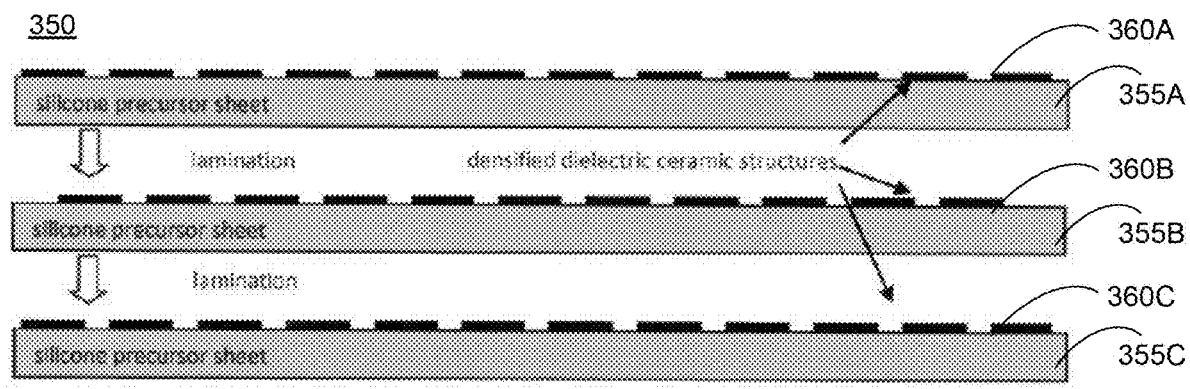
FIG. 3 is a diagram of introducing dielectric ceramic structures into elastomers during compression mold curing, in accordance with an embodiment.

While FIG. 2 illustrates screen printing layers of dielectric ceramic particulates 260A-C onto layers 255A-C of uncured elastomer, other methods may be used to layer the ceramic particulate 260A-C onto the layers 255A-C of uncured elastomer. For example, FIG. 3 is a diagram of an embodiment for dielectric ceramic particulates 260A-C into elastomers during compression mold curing. FIG. 3 shows layers 355A-C of uncured elastomer and dielectric ceramic structures 360A-C, which comprise dielectric ceramic particulates.

In one embodiment, the dielectric ceramic structures 360A-C are formed by screen printing, slurry tape casting, or paste screen printing dielectric ceramic particulates onto a substrate with one or more shaped cavities. For example, the substrate has tile-shaped cavities or cavities having any other suitable shape capable of being evenly spaced. Printing dielectric ceramic particles onto the substrate creates dielectric ceramic structures 360A-C based on the shape and pattern of cavities of the substrate. The dielectric ceramic structures 360A-C are removed from the substrate and layered onto layers 355A-C of uncured elastomer to form an article 350 having a value of a dielectric constant between 10 and 200 and an elastic modulus between 0.1 megapascals (MPa) to 10 MPa, as described further below in conjunction with FIG. 5

In the example of FIG. 3, the dielectric ceramic structures 360A-C are separated by at least a threshold distance. In some embodiments, the threshold distance between dielectric ceramic structures 360A-C may vary at different positions along the substrate, allowing spacing between the dielectric ceramic structures 360A-C to vary along one or more dimensions of the layers 355A-C of uncured elastomer. Using dielectric ceramic structures 360A-C allows layers 355A-C of uncured elastomer and dielectric ceramic structures 360A-C to have increased elasticity relative to elasticity of a layer 255A of uncured elastomer onto which dielectric ceramic particulates 260A is printed, as shown in FIG. 2. The layer of ceramic particulates 260A-C shown in FIG. 2 are more brittle than the layers 255A-C of uncured elastomer, so printing dielectric ceramic structures 360A-C with spacing between dielectric ceramic structures 360A-C shown in FIG. 3 onto layers 355A-C of uncured elastomer retains an increased amount of flexibility by allowing portions of the uncured elastomer that do not include dielectric ceramic structures 360A-C to have a greater range of motion.

Enhancing Dielectric Constants of Elastomers Using Electric Fields

Figure 4:
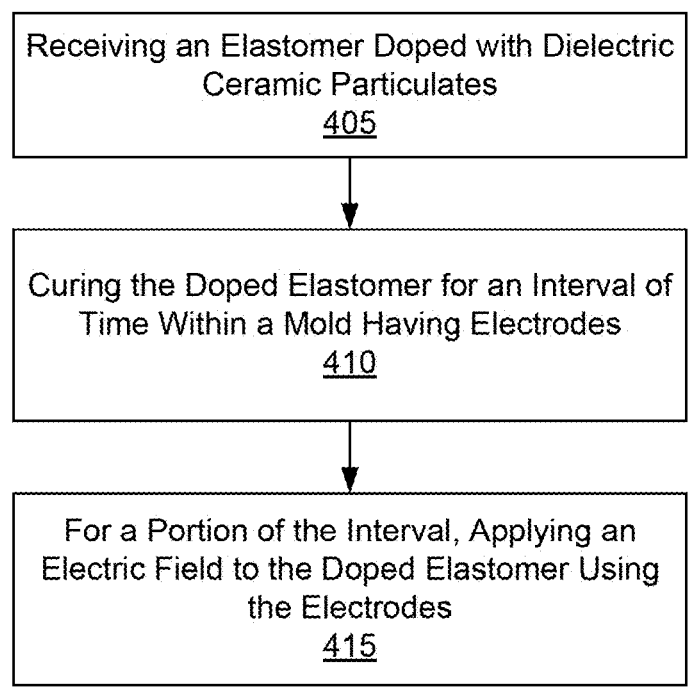
FIG. 4 is a flowchart of a method for creating an elastomer having a particular value of dielectric constant, in accordance with an embodiment.

FIG. 4 is a flowchart of one embodiment a method of creating an enhanced elastomer having a particular dielectric constant and elastic modulus. In various embodiments, the steps described in conjunction with FIG. 4 may be performed in different orders. Additionally, in some embodiments, the method may include different and/or additional steps than those shown in FIG. 4.

An elastomer doped with dielectric ceramic particulates is received 405. In various embodiments the dielectric ceramic particulates have values of dielectric constants greater than a threshold value or have a particular value of a dielectric constant. In one embodiment, the dielectric ceramic particulates have dielectric constants greater than 1000. Alternatively or additionally, the dielectric ceramic particulates have a Curie temperature within a threshold amount of a melt temperature of the elastomer. Examples of dielectric ceramic particulates include: zirconium barium titanate, strontium titanate (ST), calcium titanate (CT), magnesium titanate (MT), calcium magnesium titanate (CMT), zinc titanate (ZT), lanthanum titanate (TLT), and neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, silica, sapphire, beryllium oxide, and zirconium tin titanate. The doped elastomer may be an elastomer mixed with dielectric ceramic particulates, an elastomer layered with dielectric ceramic particulates as described in conjunction with FIG. 2, or an elastomer layered with dielectric ceramic structures as described in conjunction with FIG. 3.

The doped elastomer is brought to its melt temperature via a curing process. In one embodiment, the doped elastomer is included in a cavity coupled to a temperature adjustment device configured to maintain a temperature within a mold (e.g., a cavity) that is within a threshold amount of the melt temperature of the doped elastomer, as described above in conjunction with FIG. 1. Also as described above in conjunction with FIG. 1, the mold has electrodes positioned on at least two sides of the mold, such as on two parallel sides of the mold. The doped elastomer is then cured 410 for an interval of time within the mold.

For at least a portion of the interval of time the doped elastomer is cured 410, an electric field is applied 415 to the doped elastomer via application of a voltage to the electrodes (e.g., anode and cathode) positioned on the at least two sides of the mold by a voltage source coupled to the electrodes. The portion of the interval of time may be the full duration the doped elastomer is cured 410 or any suitable length of time while the doped elastomer is cured 410, such as a length of time while the mold has a temperature within a threshold amount of a specified temperature (e.g., a melt temperature of the elastomer, a Curie temperature of the dielectric ceramic particulates). In other embodiments, the portion of the interval of time is the portion of the interval of time associated with when the melt temperature is reached. For example, the electric field is applied 415 to the doped elastomer while a temperature within the mold including the doped elastomer is at the melt temperature of the doped elastomer or is within a threshold amount above the melt temperature of the doped elastomer. As another example, the electric field is applied 415 while the temperature within the mold including the doped elastomer is within a threshold amount from the melt temperature of the doped elastomer and is also within an additional threshold of the Curie temperature of the dielectric ceramic particulates or is within a threshold amount of the Curie temperature of the dielectric ceramic particulates. After application of the electric field during curing 410, the doped elastomer may have a value of a dielectric constant between 10 and 200 and an elastic modulus between 0.1 megapascals (MPa) to 10 MPa.

Enhancing Dielectric Constants of Elastomer Sheets

Figure 5:
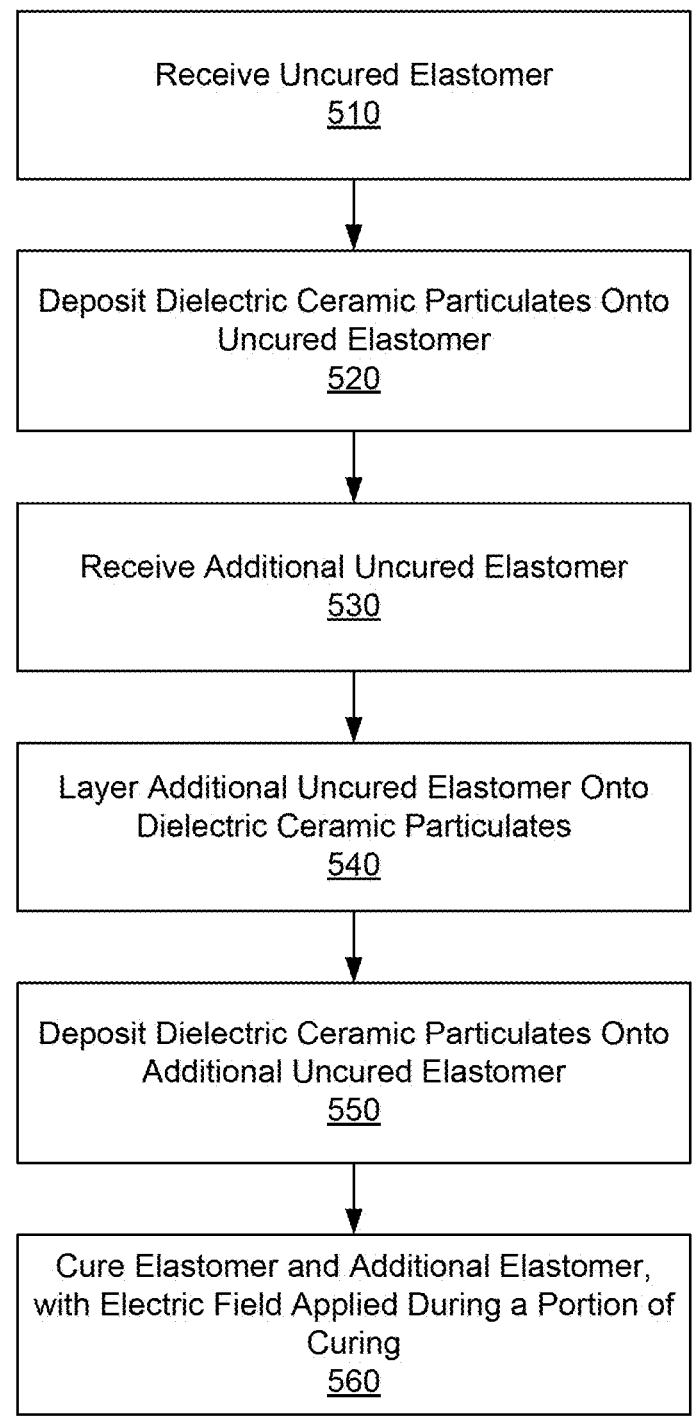
FIG. 5 is a flowchart of a method of creating an article of a plurality of elastomer having one or more values for a dielectric constant, in accordance with an embodiment.

FIG. 5 is a flowchart of one embodiment of a method for creating an article by layering doped elastomers. In various embodiments, the steps described in conjunction with FIG. 5 may be performed in different orders. Additionally, in some embodiments, the method may include different and/or additional steps than those shown in FIG. 5.

An uncured elastomer is received 510 and dielectric ceramic particulates are deposited 520 onto the uncured elastomer. As further described above in conjunction with FIG. 2, the dielectric ceramic particulates may be printed onto the uncured elastomer in some embodiments. In some embodiments, the dielectric ceramic particulates are deposited 520 onto the uncured elastomer as dielectric ceramic structures, which are further described above in conjunction with FIG. 3. An additional uncured elastomer is received 530 and layered 540 onto the dielectric ceramic particulates deposited 520 onto the uncured elastomer and dielectric ceramic particulates are deposited 550 onto the additional uncured elastomer. Different dielectric ceramic particulates may be deposited 550 onto the additional uncured elastomer than onto the dielectric ceramic particulates deposited 520 onto the uncured elastomer. Alternatively, common dielectric ceramic particulates are deposited 520, 550 onto the uncured elastomer and onto the additional uncured elastomer. Additionally, the additional elastomer and the elastomer may have different characteristics (e.g., elastic modulus) or may have common characteristics.

As described above in conjunction with FIGS. 1 and 4, the elastomer and the additional elastomer are cured 560 and an electric field is applied during a portion of the time the elastomer and the additional elastomer are cured 560. For example, the uncured elastomer, additional uncured elastomer, and the dielectric ceramic particulates are included in a mold or other cavity with electrodes positioned on at least two sides of the mold. As further described above in conjunction with FIG. 4, a voltage is applied to the electrodes while the temperature of an interior of the mold satisfies one or more conditions (e.g., is within a threshold amount of a Curie temperature of the dielectric ceramic particles), causing application of an electric field to the dielectric ceramic particulates that increases the value of the dielectric constant of the combination of the uncured elastomer, the additional uncured elastomer, and the dielectric ceramic particulates as further described above in conjunction with FIGS. 1 and 4.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
    a mold including a cavity configured to receive a plurality of layers comprising:
        an uncured elastomer,
        dielectric ceramic particulates having a value of a dielectric constant satisfying one or more conditions deposited onto the uncured elastomer,
        an additional uncured elastomer layered onto the dielectric ceramic particulates, and
        additional dielectric ceramic particulates having an additional value of an additional dielectric constant satisfying the one or more conditions deposited onto the additional elastomer;
    an anode coupled to a side of the mold and coupled to a voltage source;
    a cathode coupled to an additional side of the mold and coupled to the voltage source;
    a compression mechanism coupled to the mold, the compression mechanism configured to compress the plurality of layers;
    a temperature adjustment device coupled to the mold and configured to maintain a particular temperature within the mold; and
    a controller coupled to the voltage source and to the temperature adjustment device, the controller configured to:
        instruct the compression mechanism to compress the plurality of layers for an interval of time and at the particular temperature such as to cure the uncured elastomer and the additional uncured elastomer, and
        instruct the voltage source to apply a voltage to the anode and to the cathode to generate an electric field that causes electrostatic poling of the dielectric ceramic particulates and the additional dielectric ceramic particulates for at least a portion of the interval of time while a temperature within the mold is within a threshold amount of a Curie temperature of the dielectric ceramic particulates or of the additional dielectric ceramic particulates such that a cured elastomer and the uncured elastomer have different dielectric constants.

2. The system of claim 1, wherein a condition of the value of the dielectric constant comprises a value greater than a threshold value.

3. The system of claim 1, wherein a condition of the value of the dielectric constant comprises a specific value of the dielectric constant.

4. The system of claim 1, wherein the dielectric ceramic particulates have a Curie temperature within an additional threshold amount of a melt temperature of the uncured elastomer.

5. The system of claim 1, wherein the dielectric ceramic particulates have a Curie temperature within an additional threshold amount of a melt temperature of the additional uncured elastomer.

6. The system of claim 1, wherein the controller is further configured to instruct the voltage source to apply the voltage to the anode and to the cathode in response to the temperature within the mold being within the threshold amount of the Curie temperature of the dielectric ceramic particulates or of the additional dielectric ceramic particulates.

* * * * *